United States Patent [19]

Kurosaki

[11] 4,021,890
[45] May 10, 1977

[54] LINKING DEVICE FOR UNITING TWO PLATES IN ABUTMENT

[75] Inventor: Mutsuo Kurosaki, Moriguchi, Japan

[73] Assignee: Nifco Inc., Tokyo, Japan

[22] Filed: July 28, 1975

[21] Appl. No.: 599,621

[30] Foreign Application Priority Data

July 30, 1974 Japan .............................. 49-90127

[52] U.S. Cl. ........................ 24/73 PF; 292/253; 403/405; 16/124; 85/31; 24/81 BF
[51] Int. Cl.² ........................................ B65D 45/16
[58] Field of Search ................... 292/253; 403/405; 24/73 PF, 81 BF; 16/124, 125; 229/52 A, 45, 47; 85/49, 31

[56] References Cited

UNITED STATES PATENTS

| 1,043,690 | 11/1912 | Gould ................... 229/47 |
| 2,828,905 | 4/1958 | Frizzell ................. 229/45 |
| 3,707,023 | 12/1972 | Pfaffendorf ............ 292/253 X |

FOREIGN PATENTS OR APPLICATIONS

| 1,342,744 | 9/1963 | France ................... 16/125 |
| 1,156,219 | 6/1969 | United Kingdom ............ 229/52 A |

Primary Examiner—Andrew V. Kundrat
Attorney, Agent, or Firm—Jack R. Halvorsen; Robert W. Beart

[57] ABSTRACT

A linking device is disclosed which comprises a connecting strip, a main trunk section formed integrally at each end of said connecting strip and an engaging member formed by extending the forward perpendicular end of said each main trunk section into an inserting and engaging portion integrally incorporating a hook element of the shape of a hook. Butting union for two covering flaps of a container is accomplished by having perforations bored in advance one in each of said covering flaps at opposed positions across the butting edges of said covering flaps, inserting said inserting and engaging portions into said opposed perforations and pressing said main trunk sections downwardly, whereby the inserting and engaging portions advance through the perforations until the tips of said hook elements collide into the covering flaps on the edges of said perforations and, in consequence of said collision, the inserting and engaging portions are caused to advance in inwardly bent directions, causing said hook elements and the corresponding inserting and engaging portions to take firm grip of said edges of the respective perforations in the covering flaps.

3 Claims, 8 Drawing Figures

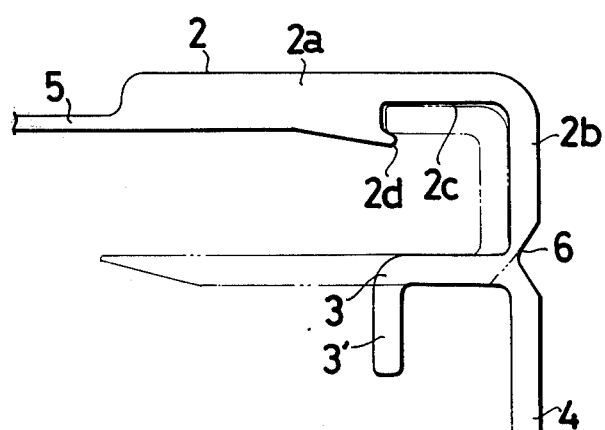
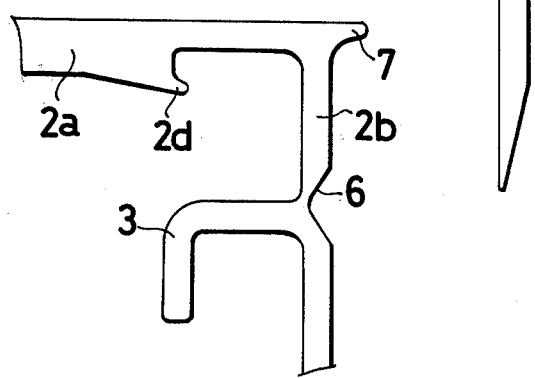

4,021,890

LINKING DEVICE FOR UNITING TWO PLATES IN ABUTMENT

BACKGROUND OF THE INVENTION

This invention relates to a linking device for providing butting union for two plates which are placed in one plane with their respective edges butting on each other.

As is universally known, the upper cover for a corrugated cardboard box if formed by having the four vertical walls of said box bent at opposite upper edges of the box proper and extended in the form of flaps in mutually confronting directions. The upper opening of the box proper is closed by first bending one pair of opposed flaps into one common plane and then bending immediately thereon the other pair of opposed flaps into another common plane. Although the box can be kept closed by typing a cord around it, simple closure of the box is generally accomplished by fixing button-shaped catches one close to the edge of each of the confronting flaps and then connecting the two catches with a thin cord (such as a strong thread) passed around them so as to keep the folded pairs of flaps from being opened. Otherwise, there is adopted a method whereby a rubber strip each end of which is provided with a metal piece containing vertically raised claws is stretched across the line of abutment of the opposed flaps and, with the rubber strip kept in that stretched state, the claws are driven into said opposed flaps downwardly from their outer surface so as to keep the butting edges thereof from being opened.

Since these methods permit rather easy closure of the box, they have found widespread acceptance. Nevertheless, the devices used in these methods are very simple in construction and, therefore, have a disadvantage that they are easily disengaged and readily damaged and, after only a small number of uses, cease to function normally.

An object of the present invention is to provide a linking device capable of easy operation and providing safe butting union for two plates placed side by side.

Another object of the present invention is to provide a linking device capable of easy disengagement and permitting repeated use.

SUMMARY OF THE INVENTION

To accomplish the objects described above, the present invention provides a linking device for uniting two plates in abutment, which comprises a pair of engaging members each formed of an L-shaped main trunk section the forward perpendicular end of which extends via an intervening hinge portion into an inserting and engaging portion having a hook element integrally incorporated therein, said two engaging members being diposed so that the hook elements respectively thereof symmetrically confront each other, and a flexible connecting strip extending to connect the end of one of said pair of main trunk sections to the end of the other main trunk section.

The linking device according to the present invention has a construction as described above and possesses flexibility due to use of an elastic material. Butting union of two covering flaps, therefore, is accomplished by having perforations bored in advance one in each of said covering flaps at opposed positions across the butting edges of said covering flaps, inserting said inserting and engaging portions into said opposed perforations and pressing said main trunk sections downwardly, whereby the inserting and engaging portions advance through the lperforations until the tips of said hook elements collide into the covering flaps on the edges of said perforations and, in consequence of said collision, the inserting and engaging portions are caused to advance in inwardly bent directions, causing said hook elements and the corresponding inserting and engaging portions to take firm grip of said edges of the respective perforations in the covering flaps. Safe union of two covering flaps can be secured merely by inserting the inserting and engaging portions of this linking device into the perforations and pressing the main trunk sections thereof and the union can be broken by lifting the main trunk portion upwardly in a perpendicular direction to pull the inserting and engaging portions out of the perforations. The linking device of this invention, therefore, can be used repetitively.

The other objects and characteristic features of the present invention will become apparent from the description to be given in further detail herein below with reference to the accompanying drawings.

BRIEF EXPLANATION OF THE DRAWING

FIG. 4 and FIG. 5 are fragmentary enlarged front views illustrating other preferred embodiments of the linking device according to the present invention.

Figure 1:
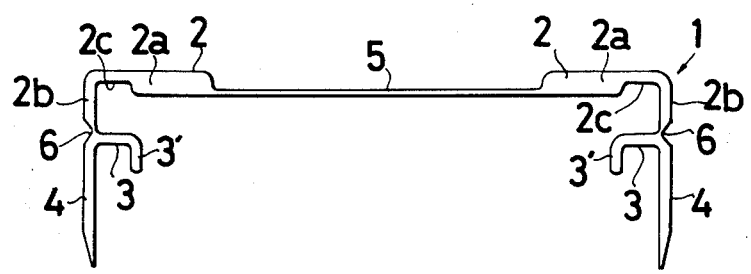
FIG. 1 is a front view illustrating one preferred embodiment of the linking device according to the present invention.

DETAILED DESCRIPTION OF THE INVENTION:

With reference to FIG. 1, a connecting strip 5 is provided at each of the opposite ends thereof with an engaging member 1 which comprises an L-shaped main trunk section 2 and an inserting and engaging portion 4 extending from the forward perpendicular end of said main trunk section and integrally incorporating a hook element 3 having the shape of a hook.

To be more specific, as illustrated, said pair of engaging members 1 are disposed in such a way that the hook elements 3 of the respective inserting and engaging portions symmetrically confront each other across the connecting strip 5 and they are connected into an integral whole by causing the rear ends of the main trunk sections 2 extending in the direction of the butting to be joined to the corresponding ends of the connecting strip 5.

In the L-shaped main trunk section 2 of said engaging member, the portion of one side 2a of the L at the rear end of said trunk section is formed with a thick wall and the other side 2b of the L and the outermost portion of said one side 2a of the L are formed with a thinner wall so as to embrace a recess 2c on the underside. From the forward end of the side 2b of the thinner wall is extended the inserting and engaging portion 4. To the forward end of the main trunk section, said inserting and engaging portion 4 is connected pendently via a constricted hinge portion 6 so that it may freely be bent with this hinge portion as the fulcrum. And the inserting and engaging portion 4 is designed so that when it is bent so much as to be parallel with said one side 2a of the main trunk section, the hook element 3 protruding in a perpendicular direction comes to lie against the other side 2b of the main trunk section and, at the same time, the tip 3' protruding in a folded pattern bends perpendicularly and consequently comes into fast engagement with the recess 2c formed on the underside of the other side 2a of said main trunk section.

The linking device of the present invention having the construction mentioned above is molded integrally of a plastic material and therefore possesses flexibility.

Figure 2:
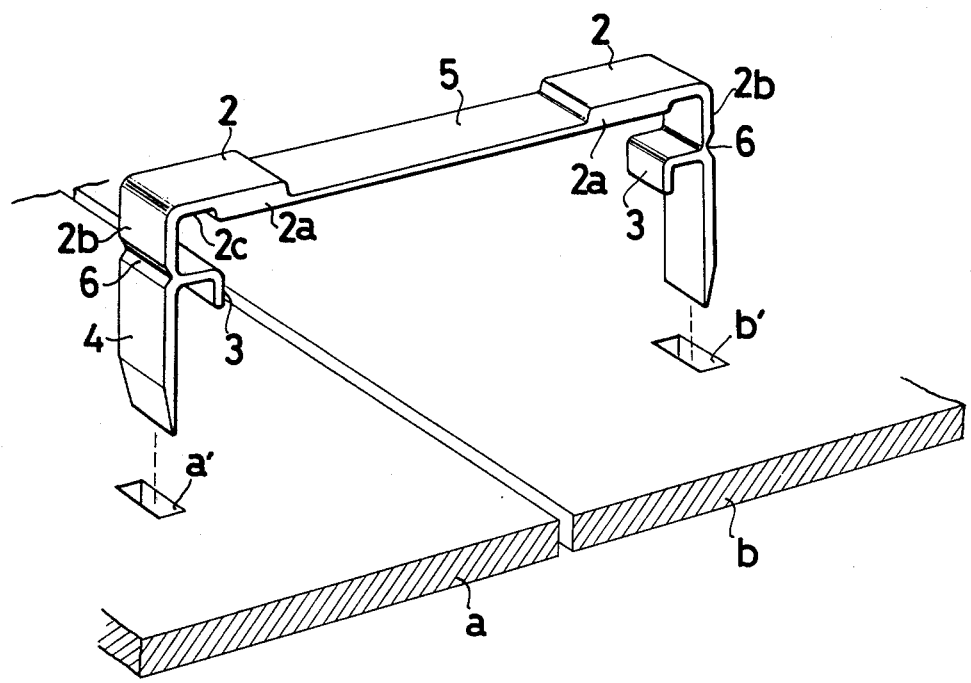
FIG. 2 is a perspective view of the linking device of FIG. 1.

Now the manner in which two covering flaps of a corrugated cardboard box are joined by use of the linking device of the aforementioned description will be described with reference to FIG. 2 and FIG. 3.

Figure 3A:
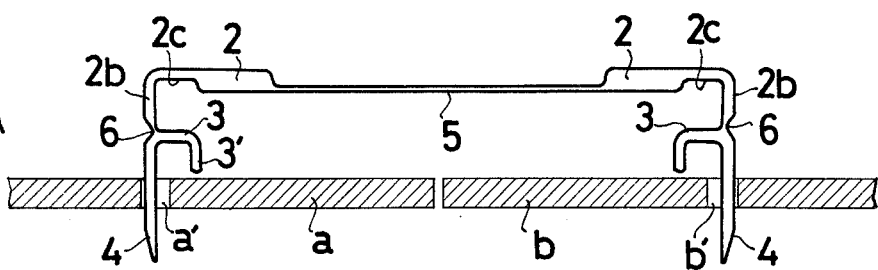
FIG. 3 (A) – (D) are explanatory diagrams illustrating a process in which two plates are brought into butting union by use of the linking device of the present invention.
Figure 3B:
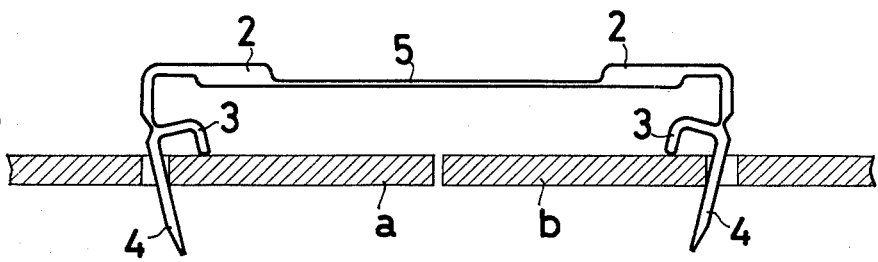
Figure 3C:
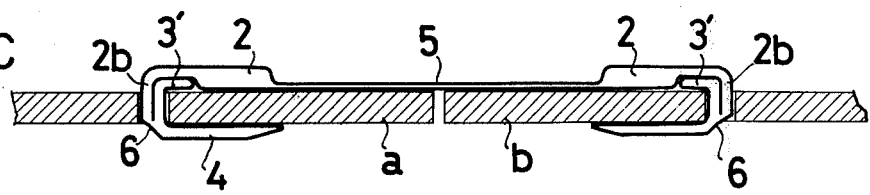
Figure 3D:
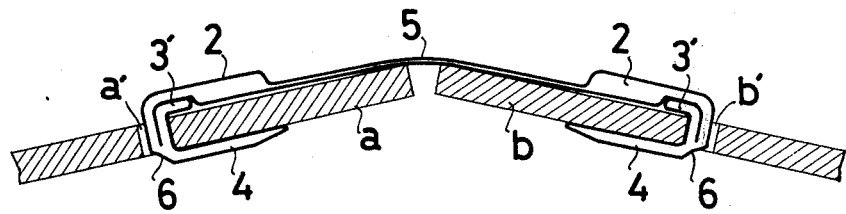

As illustrated, the two covering flaps a and b are bored in advance with perforations a' and b' respectively. The positions of the two perforations are desired to be at predetermined distance from each other across the butting edges of said covering flaps i a and b. They are not always required to be in exact symmetry with each other with respect to the distance from the edge of each respective flap. If the perforations are bored too close to the butting edges, however, there is a possibility that breakage will occur in the covering flaps while the linking device is in use. The distance between the two perforation a' and b' is so fixed as to substantially equal the distance between the two inserting and engaging portions 4 at the opposed ends of the linking device. The inserting and engaging portions 4 of the respective engaging members 1 are brought downwardly toward the flaps a and b formed as described above in such a way that said portions 4 will be inserted into the respective perforations a' and b' in the flaps (FIG.2). Then, the inserting and engaging portions 4 are perpendicularly inserted into the perforations a' and b' until the forward ends of the hook elements 3, 3 (namely, the forward ends of tips 3') collide into the upper surfaces of the flaps a and b as illustrated in FIG. 3(A). Thereafter, the two main trunk sections 2 are pushed down by pressing the finger tips against the upper surfaces thereof and thereby the inserting and engaging portions are bent inwardly at the hinge portions 6, while the forward ends of the hook elements which have already collided into the upper surfaces of the flaps serve as the pillows (FIG. 3(B)), with the result that the forward ends of the main trunk sections (namely, the forward ends of the sides 2b) are pushed into the perforations a' and b' and the inserting and engaging portions advance past the lower surfaces of the flaps a and b and bend themselves perpendicularly until they come to lie against the undersides of the flaps. At the same time, the bases of the hook elements 3 are drawn into intimate contact with the perforations a' and b' and come to lie against the sides 2b at the forward ends of the main trunk sections 2 owing to the pressure of the finger tips. In addition, the tips 3' of said hook elements are brought into snug engagement with the recesses 2c formed on the undersides of the rear ends of said main trunk sections. Thus is completed the butting union (FIG. 3 (C)).

In the linking device of the present invention which is fixed in position as described above, when the forward ends (sides 2b) of the main trunk sections of the engaging members are inserted into the perforations a' and b' in the respective flaps, the inserting and engaging portions 4 are simultaneously bent perpendicularly and the hook elements 3 are set into position for immovably holding the edges of the respective perforations. Consequently, when as outer force is exerted to open the flaps a and b, the flexibly molded connecting strip 5 is deformed in conformity with the changing contour of the flaps so much as to preclude possible release of the forward ends (sides 2b) of the main trunk sections. Therefore, the forward ends remaim within the perforations to reinforce the union, ensure the retention of the inserting and engaging portions and impede the covering flaps from being released from the union (FIG. 3(D)).

FIG. 4 illustrates another preferred embodiment of the linking device according to the present invention. In this embodiment, the corner of the step rising from the recess 2c embraced on the underside of each of the main trunk sections 2 is extended into a projection 2d. In the linking device wherein there are incorporated projections 2d as described above, when the inserting and engaging portions 4 are inserted through the perforations a' and b' in the covering flaps and then forced to advance in the perpendicularly bent directions, the tips 3' of the hook elements 3 will come to lie against the recesses 2c and the forward ends of the tips 3' will get caught by said projections 2d. Consequently, the inserting and engaging portions 4 which have been bent perpendicularly will be prevented by the projections from opening to their original positions. Thus, this state of engagement can be retained with added safety.

To enhance the ease with which the inserting and engaging portions of the linking device now retaining the two covering flaps in the state of butting union are drawn out of the perforations, the shoulders of the main trunk sections 2 are extended into projections 7. The projections 7 are given a thickness smaller that that of the main trunk sections 2 so that, when the linking device is brought into engagement with the covering flaps, some space is allowed to occur between the projections 7 and the surface of the covering flaps. The inserting and engaging portions can easily been drawn out of the perforations by pushing the projections upwardly with the finger tips placed in the space under said projections 7.

Where the corrugated cardboard box has a relatively light weight or the perforations bored therein are reinforced with a suitable reinforcing material, the connecting strip of the linking device fastened to that box may serve as a handle for the box to be lifted up for the purpose of movement.

Since the linking device is to be integrally molded of a plastic material possessed of flexibility, it is easy of manufacture. While the linking device remains in fast engagement with the perforations in the covering flaps, a vertical pull given at the main trunk section 2 causes the corresponding inserting and engaging portion 4 to be stretched out vertically and drawn easily from the perforation. Thus, the linking device can be repeatedly used and, therefore, is suitable for use as closing means for a container such as a corrugated cardboard box which has covering flaps adopted to be fastened by butting union.

In the actual operation of the linking device of the present invention, strong union of two plates thereby can be obtained by giving to the perforations bored in advance in the plates subjected to butting union such a diameter that said diameter equals the combined thickness of the side 2b of the main trunk section 2 and the hook element 3 of the inserting and engaging portion 4 and then causing the inserting and engaging portions to be pushed rather forcibly through the perforations while said inserting and engaging portions are in the process of being inserted through said perforations. When an external force is exerted to cause the plates held in butting union to be moved away from each other, the force has its effect directly upon the forward ends of the main trunk sections 2. For ensuring fast union of the two plates, therefore, it may suffice to have the main trunk sections given an ample wall thickness enough to prevent the sides 2a and the sides 2b from coming apart from each other.

In either of the illustrated embodiments, the connecting strip 5 has a thickness smaller than that of the main trunk sections 2. However, a belt-shaped or cord-shaped linking device using a connecting strip having the same wall thickness as that of the main trunk sections may likewise be used effecttively.

What is claimed is:

1. A linking device for uniting the edges of two apertured plates in abutment along said edges, said device including a pair of engaging members each formed as an L-shaped main trunk section and a flexible connecting strip extending between and connecting the end of one of said pair of main trunk sections to the end of the other main trunk sections, the forward perpendicular free end of each L-shaped section includes and is connected to an intervening flexible hinge portion connected to an inserting and engaging portion substantially co-planar with said perpendicular free end and having a hook element integrally incorporated therein, said two engaging members being disposed so that the hook elements respectively thereof symmetrically confront each other.

2. The linking device according to claim 1 wherein each L-shaped main trunk section has a thickened portion at the end attached to the connecting strip defining a recess adjacent the juncture of the forward perpendicular end of the L-shaped section, each hook element including an inwardly directed portion parallel to the main trunk section and a perpendicular element shorter than but generally parallel to its adjacent engaging member whereby when the hook element is bent the forward tip of the hook element parallel to the engaging element comes to lie within the recess formed on the underside of the corresponding main trunk section.

3. The linking device according to claim 2, wherein the corner of the thickened portion forming the recess located on the underside of each main trunk section includes a projection extending into the recess.

* * * * *